United States Patent [19]

McKinley et al.

[11] 3,821,188
[45] June 28, 1974

[54] PROLINE AND PYROGLUTAMIC ACID CONTAINING TRIPEPTIDES

[75] Inventors: Wayne A. McKinley, Wallingford; William H. McGregor, Malvern, both of Pa.

[73] Assignee: American Home Products Corporation, New York, N.Y.

[22] Filed: June 14, 1972

[21] Appl. No.: 262,887

[52] U.S. Cl. ............................. 260/112.5, 424/177
[51] Int. Cl. ...................... C07c 103/52, C07g 7/00
[58] Field of Search ................................. 260/112.5

[56] References Cited
OTHER PUBLICATIONS

Meinenhofer et al., J. Am. Chem. Soc., 82, 2279 (1960).
Bodanszky et al., J. Am. Chem. Soc., 86, 4452 (1964).
Huguenin et al., Helv. Chim Acta, 46, 1669 (1963).
Zaoral, Coll. Czech. Chem. Comm., 30, 1853 (1965).
Kolc et al., Coll. Czech. Chem. Comm., 32, 2667 (1967).
Merrifield, Adv. in Enzymology, 32, 244 (1969).
Stewart et al., "Solid Phase Peptide Synthesis", Freeman & Co., San Fran. (1969), pp. 1–5.
Fieser et al., "Reagents for Organic Chemistry", Wiley & Sons, N.Y. (1967), pp. 114–115.

*Primary Examiner*—Lewis Gotts
*Assistant Examiner*—Reginald J. Suyat

[57] ABSTRACT

Novel synthetic proline and/or pyroglutamic acid containing peptides are described which are useful for therapeutic purposes such as reduction of blood platelet adhesiveness.

5 Claims, No Drawings

PROLINE AND PYROGLUTAMIC ACID CONTAINING TRIPEPTIDES

This invention relates to novel synthetic proline or pyroglutamic acid containing peptides, processes for their preparation and uses thereof.

One aspect of the present invention relates to the novel L-proline or pyroglutamic acid containing tripeptides and novel intermediates.

Another aspect of the present invention relates to the synthesis of L-proline containing tripeptides, pyroglutamic acid containing tripeptides and novel intermediates therefor.

These and other aspects of the present invention will become apparent from the following description.

The present invention relates to novel tripeptides of the following formula containing the "L" form of the amino acid:

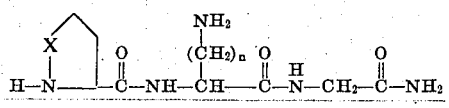

wherein:
X is selected from the class consisting of H-C-H and

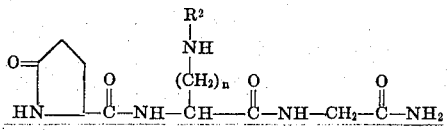

$n$ is a whole number from 2 to 5.

The present invention also covers novel intermediates of the formula:

wherein: $R^2$ is a side chain amino protecting group and $n$ has the same meaning as previously set forth.

The preferred compounds of this invention are those in which X is $CH_2$ and $n$ is 4.

The products of formulas A and B may be in the form of the free base or a non-toxic salt thereof. Illustrative of pharmaceutically acceptable acid addition salts are hydrochloride, hydrobromide, sulfate, phosphate, maleate, acetate, citrate, benzoate, succinate, malate, ascorbate and the like.

The preparation of the tripeptides of the present invention is illustrated by the following reaction schemes:

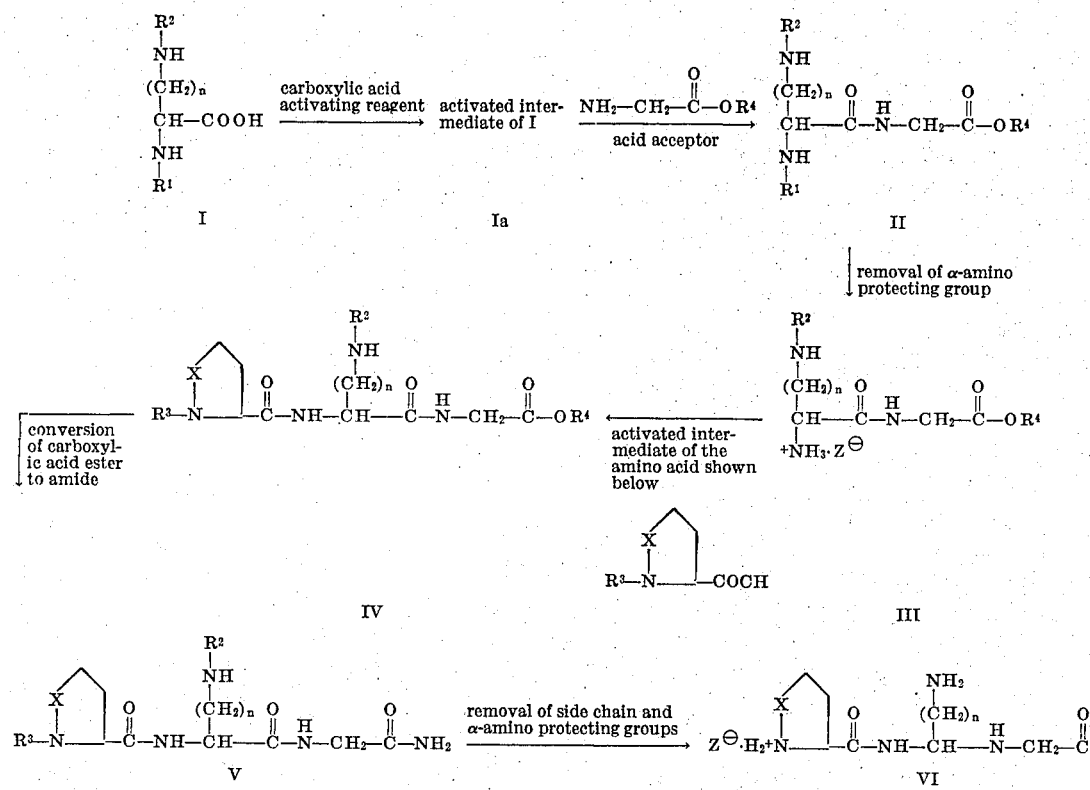

REACTION SCHEME II

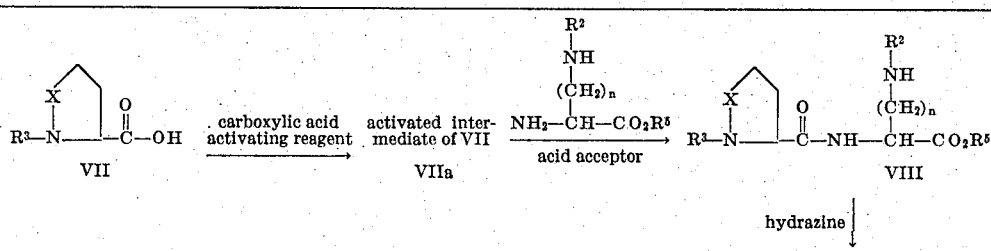

REACTION SCHEME II.—Continued

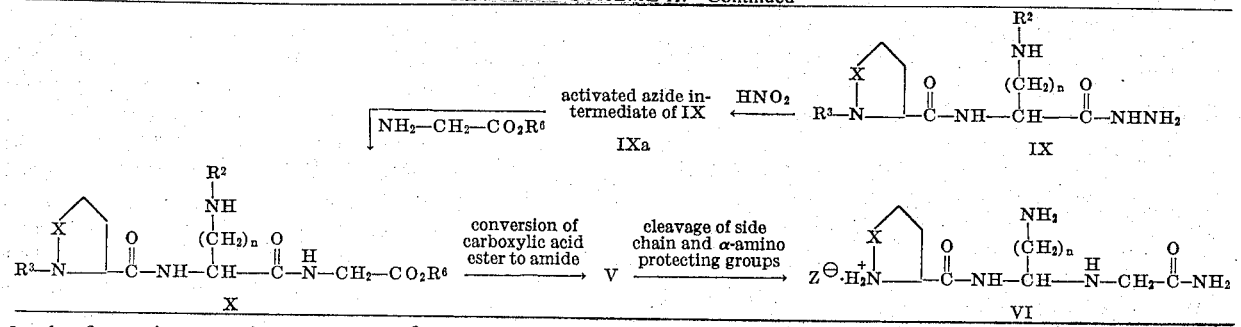

In the foregoing reaction schemes $R^2$ and n have the same meaning as previously set forth: Z is an anion; $R^1$ and $R^3$ are each an α-amino blocking group provided that when X is

$R^3$ is hydrogen. Since it is necessary to reversibly protect and deprotect the α-amino group of the amino acid to be added to the peptide chain in each instance, the α-amino blocking group must be stable enough to withstand the conditions of activation and coupling but labile enough to be quickly removed under conditions which do not affect the side-chain protecting groups. Illustrative of blocking groups defined by $R^1$ and $R^3$ are t-lower alkyloxycarboxyl (e.g., t-butyloxycarbonyl) o-nitrophenylsulfenyl, benzyloxycarbonyl, biphenylisopropyloxylcarbonyl, trifluoroacetyl, formyl, tosyl, 3-pentyloxycarbonyl, cyclopentyloxycarbonyl, phthalyl, p-methoxybenzyloxycarbonyl, p-nitrobenzyloxycarbonyl, p-chlorobenzyloxycarbonyl, trityl, etc. Other α-amino protecting groups may be used, the selection of which is with the skill of the art. $R^2$ is a side-chain protecting group for an amino-nitrogen atom. The selection of such a group is not critical except that it must be one which is not removed during deprotection of the α-amino group and can be cleaved under conditions that will not alter the structure of the peptide. Illustrative of side-chain protecting groups defined by $R^2$ are benzyl, benzyloxycarbonyl, tosyl, t-butyloxycarbonyl, 2,4-dinitrophenyl, t-amyloxycarbonyl, etc. Other groups previously mentioned in connection with protecting the α-amino group may also be used. $R^4$, $R^5$ and $R^6$ are each α-carboxyl protecting radicals such as benzyl, (lower) alkyl having up to seven carbon atoms (e.g., methyl, ethyl, t-butyl), p-nitrobenzyl, etc. This protecting group is stable under the conditions employed to cleave the α-amino protecting group at least until the peptide having the desired number of amino acids has been synthesized.

The reagent for activating the carboxylic acid may be selected from those well known in the art for use in peptide synthesis. A list of the more common activating agents and their mechanism of reaction with an amino acid appears in the Schroeder & Lubke text, "The Peptides," Vol. 2, pp. 76 through 125, (Academic Press 1965). Illustrative of some reagents used in activating the carboxylic acid are dicyclohexylcarbodiimide, hydrazine in combination with a nitrite, N-hydroxy succinimide, carbonyldiimidazole, p-nitrophenol, t-butylchloroformate, isobutylchloroformats, ethylchloroformate, N-ethoxycarbonyl-2-ethoxy-1,2-dihydroquinoline, etc. The type product formed when one of the foregoing reagents is used to activate the carboxylic acid groups generally falls in the following classes: an ester, an amide, mixed anhydride and an azide.

In the foregoing process the reaction of a compound of formula I with a carboxylic acid activating reagent is carried out at a temperature of about 0°C. to room temperature in presence of an anhydrous inert organic solvent. Illustrative solvents are hydrocarbons such as benzene and toluene; chlorinated solvents such as methylene chloride, chloroform and chlorobenzene; ethers such as diethyl ether, dioxane, tetrahydrofuran; other conventional solvents such as methylisobutyl ketone, dimethylformamide, etc.

The conversion of the activated intermediate of formula Ia to a compound of formula II is carried out by reacting a glycine ester, preferably between 0°C. and room temperature in the presence of an acid acceptor such as a tertiary amine (e.g., triethylamine, morpholine, dimethylaniline, pyridine, lutidine, quinoline, etc.); alkali metal carbonates, alkali earth carbonates or other acid binding agents known in the art.

In the next step of the process the α-amino protecting group is removed in the presence of a proton yielding reagent to obtain the stable acid addition salt of formula III. The selection of a suitable reagent for cleavage of the α-amino protecting group is dependent on the type of protecting radical on both the α-amino group and side chain group. At this stage in the synthesis, the cleavage should be selective in removing only the α-amino protecting group and not the side chain protecting group. Illustrative cleaving reagents include HBr, trifluoroacetic acid, glacial acetic acid, alcoholic hydrochloric acid solution, sodium in liquid ammonia, ammonium hydroxide, sodium hydroxide, $H_2$/Pd catalyst in acetic acid, etc. A listing of the preferred cleaving reagents for each of the more common α-amino protecting groups and the standard conditions for such cleavage appears in the text "Chemistry and Biochemistry of Amino Acids, Peptides and Proteins," Vol. 1, pp. 72–74, (Marcel Dekker Inc. 1971).

The dipeptide of formula III is reacted with an activated intermediate of proline or pyroglutamic acid, preferably at a temperature between 0°C. and room temperature. These activated intermediates may be prepared in accordance with well known prior art techniques described by Schroeder et al in their text, "The peptides." The foregoing reaction produces the tripeptide of formula IV which is then converted to a C-terminal amide of formula V such as by treating the ester with ammonia in an alcoholic solution, preferably at a temperature between about 0°C. and room temperature. Alternatively, the ester of formula IV may be converted to the acid by saponification followed by formation of the acid chloride or mixed anhydride which in turn is reacted with ammonia to form the amide. In the final step of the process, the side chain protecting group and α-amino protecting group of a compound of formula V are removed by using the same type of reagents previously described in cleavage of the $R^3$ protecting group in formation of the dipeptide of formula III. The cleavage of the protecting group is preferably carried out in a single step selecting a reagent that will split off the protecting group from both the α-amino group and the side-chain group. However, this may be done stepwise by first deprotecting the α-amino group with one reagent which does not cleave side-chain protecting group and thereafter use another reagent to cleave the side-chain protecting group or vice versa.

The reaction sequence of scheme I starts with the C-terminated amino acid portion of the tripeptide to be synthesized and adds the N-terminated amino acid portion of the tripeptide last. This sequence can be reversed as shown in reaction scheme II where the synthesis is commenced from the N-terminated portion of the tripeptide to be synthesized and the C-terminated amino acid portion is added on last. The α-amino protected amino acid of formula VII is activated and then reacted with a side chain protected carboxylic acid ester of either lysine, ornithine or α, γ-diaminobutyric acid to produce a compound of formula VIII. The ester is converted to the corresponding azide as described by Schroeder et al, "The Peptides," Vol. 1, (1965), pp. 79–81. The dipeptide of formula IX is treated with a carboxylic acid activating reagent which may be selected from among those previously described to obtain the activated intermediate of formula IXa. This intermediate is then reacted with a glycine ester to form the C-terminated ester of formula X which is converted in the manner previously described to the corresponding C-terminated amide followed by cleavage of the α-amino and side chain protecting groups as previously set forth in reaction scheme I.

Modifications of the aforedescribed processes may be employed to synthesize the tripeptides of the present invention. For example, in reaction scheme I, the activated intermediate Ia may be reacted with an amide of the formula

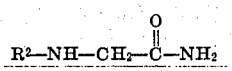

instead of with the corresponding amino acid ester. Using the amide at that stage in the synthesis eliminates the step of converting a C-terminated tripeptide ester of formula IV to a C-terminated tripeptide amide of formula V. Similarly, in reaction scheme II, the amino acid ester used to obtain the C-terminated tripeptide ester of formula X can be replaced with the corresponding amino acid amide.

The tripeptides of the present invention can also be synthesized using solid phase techniques instead of the classical methods. This method follows the same reaction sequence as shown in reaction scheme I. However, in carrying out a solid phase reaction the $R^4$ substituent is anchored to a solid resin support which is insoluble in all of the solvents required for the synthesis. Thus where $R^4$ is benzyl it is anchored through one of the carbons of its aromatic ring to the resin support. The process for anchoring a benzyl ester of an amino acid to a resin support is described in the art (see, for example, Merrifield, J. Amer. Chem. Soc. 85, 2153, (1963). The solid supports are generally polystyrene based supports such as small beads made from a copolymer of styrene and about 1 percent divinylbenzene or they may comprise glass beads having a film deposit of polystyrene thereon. The beads are about 50 μ in diameter. The amino acid remains anchored to the resin support throughout the synthesis until the desired tripeptide has been synthesized. This tripeptide is then reacted with a strong anhydrous acid such as HF or HBr in trifluoroacetic acid resulting in cleavage of the protecting group which is anchored to the resin support. Thus, cleavage of a tripeptide having a C-terminated protecting group such as a C-terminated benzyl ester anchored to a resin yields the C-terminated free amino acid. Cleavage can also be effected by transesterification and ammonolysis reactions which give rise to the corresponding peptide esters and amides. Therefore, in reaction schemes I and II the definition of the α-carboxyl protecting groups include those which are anchored to a resin support. Similarly, where the amino acid ester is replaced by an amino acid amide in the reaction scheme, the amide may be linked through a suitably anchoring group (e.g., diphenylmethylene) to a resin support.

The following examples are illustrative of the products and processes of the present invention.

EXAMPLE 1

L-Prolyl-L-lysyl-glycinamide a. $N^\alpha$-t-Boc, $N^\epsilon$-Cbz-L-lysylglycine ethyl ester $N^\alpha$-Boc, $N^\epsilon$-cbz-L-lysine (5.27 g., 14 mM) described in Ann 716, 175, (1968) and carbonyldiimidazole (2.1 g., 13 mM) are reacted in 20 ml. tetrahydrofuran for 15 min. at ambient temperature. Glycine ethyl ester hydrochloride (1.81 g., 13 temperature and 1.81 ml. (13 mM) of triethylamine are added in tetrahydrofuran and stirred at ambient temperautre over the weekend. The reaction is filtered, evaporated under reduced pressure at >30°C. and the residual oil taken up in ethyl acetate and extracted with cold dilute citric acid, water, N ammonium hydroxide, water and dried over sodium sulfate. Evaporation of the solvent leaves an oil which crystallizes from isopropyl ether, 4.94 g. (82 percent). A second crop 0.25 g. was obtained from the mother liquor.

b. $N^\epsilon$-Cbz-L-Lysylglycine ethyl ester hydrochloride $N^\alpha$-boc, $N^\epsilon$ cbz-L-lysylglycine ethyl ester (4.94 g., 10.6 mM) described in J. A. C. S. 77, 1524 (1955) is dissolved in glacial acetic acid and acetic acid saturated with hydrochloric acid is added, the solution cooled to 0°C. for 1 hr. and the colorless crystalline solid is removed by filtration and washed with ether giving 4.09 g. (96 percent) of the above titled product.

c. Cbz-L-prolyl-$N^\epsilon$-cbz-L-lysyl-glycine ethyl ester

To 3.69 g. (10 mM) of cbz-L-proline p-NO$_2$ phenyl ester in chloroform is added 4.01 g. (10 mM) of $N^\epsilon$-cbz-L-lysylglycine ethyl ester hydrochloride partly dissolved in chloroform, followed by 1.39 ml. (10 mM) triethylamine and this solution allowed to stir overnight at ambient temperature. The reaction mixture is washed with N ammonium hydroxide, water, N hydrochloric acid, water and dried over sodium sulfate. After removal of the solvent under reduced pressure <30°C. the residue is dissolved in ethyl acetate and an equal volume of ether is added. On chilling in an icebath 2.27 g. (38 percent) of the above titled product as solid is obtained which is homogeneous on TLC silica gel solvent chloroform/methanol 25:1. A second crop 0.370 g. (6 percent) is obtained from the mother liquors.

d. Cbz-L-prolyl-N$^\epsilon$ cbz-L-lysylglycinamide

Cbz-L-prolyl-N$^\epsilon$-cbz-L-lysylglycine ethyl ester (2.2 g. 3.69 mM) is dissolved in ethanol and saturated with ammonia at 0°C. The reaction is allowed to proceed for 2 days at ambient temperature, concentrated under reduced pressure and the residue is chromatographed on silica gel in chloroform-methanol 9:1. The fraction with $R_f$ 0.45 on TLC is collected giving a solid on trituration with Et$_2$O. The yield is 1.23 g. (59 percent) of the above titled product.

e. L-Prolyl-L-lysyl-glycinamide

Cbz-L-prolyl- N -cbz-L-lysyl-glycinamide (1.20 g.) is dissolved in 30 percent hydrogen bromide in acetic acid and reacted one hour at ambient temperature. The solvent is removed under reduced pressure and the resulting yellow residue dissolved in methanol and decolorized with carbon. Addition of dimethoxyethane precipitates the above titled product which is a crystalline solid that is hydroscopic.

| Anal. for: | $C_{13}H_{25}O_3N_5$· 2HBr · 1 H$_2$O | |
|---|---|---|
| | C 32.58 | found 32.63 |
| | H 6.10 | found 6.38 |
| | N 14.61 | found 13.81 |

The compound is further purified on preparative cellulose in n-butanol-acetic acid-water (4:1:1) and elution of the material with water. The product is homogeneous on TLC silica gel n-propanol-ammonia (7/3), on cellulose n-butanol-acetic acid-water (4:1:2) and on thin layer electorphoresis on cellulose, (neutral buffer).

EXAMPLE 2

L-Pyroglutamyl-L-lysyl-glycinamide acetate a. Pyroglutamyl-$\epsilon$-carbobenzoxy-L-lysine, methyl ester Pyroglutamic acid, 1.55 g. (12 meq.) is combined with $\epsilon$-carbobenzoxy-L-lysine, methyl ester hydrochloride, 4 g. (12 meq.) in 35 ml. of absolute ethanol at 0°C. Triethylamine (1.68 ml., 12 meq.) is added whereupon all solid dissolves. EEDQ (N-ethoxy-2-ethoxy-1,2-dihydroquinoline) 3.0 g. (12 meq.) is added and dissolved with the aid of 15 ml. methylene chloride. The solution is stirred overnight at room temperature. The solvent is evaporated under reduced pressure and the resulting oily solid dissolved in ethylacetate and washed thrice with each of the following: N/2 HCl, H$_2$O, 5% Na$_2$CO$_3$ and saturated brine. Evaporation under reduced pressure yields 3.2 g. (66 percent) of the title compound (a) as an oily solid which is used without further purification. TLC (SG/CHCl$_3$—MeOH, 19:1) showed a major component, $R_f$ 0.25 plus trace of material corresponding to quinoline.

b. Pyroglutamyl-$\epsilon$-carbobenzoxy-L-lysine, hyrazide

Compound (a) is dissolved in 20 ml. of methanol and cooled to −10°C. 1.6 ml. hydrazine is added and the mixture stirred at −10°C. for 1 hr. and at 4°C. for 66 hrs. The resulting oily precipitate is solidified by addition of ether and collected. Recrystallization from MeOH-ether yields 2.04 g. (64 percent) white solid, m.p. 95°-97°C.

c. L-Pyroglutamyl-$\epsilon$-carbobenzoxy-L-lysyl-glycine, methyl ester

The hydrazide obtained in (b) 0.81 g. (2 meq.) is dissolved in 10 ml. dimethylformamide and cooled to −20°C. 6 ml. (15 meq.) 2.5 N HCl/THF is added followed by 0.4 ml. (2.7 meq.) isoamyl nitrite. The mixture is stirred for 45 minutes at −30° to −20°C. 2.1 ml. (15 meq.) triethylamine are added followed by glycine methyl ester derived from 0.37 g. (2.7 meq.) of the hydrochloride. The mixture is stirred at 4°C for 72 hrs. It is then filtered and the solvent evaporated in vacuo. The residue is dissolved in chloroform and the solution washed as in (a) supra. Evaporation under reduced pressure yields 754 mg. (79 percent) of the title compound (c) which is recrystallized from ethyl acetate.

d. L-Pyroglutamyl-$\epsilon$-carbobenzoxy-L-lysyl-glycinamide 700 mg. (1.47 meq.) of compound obtained in (c) is dissolved in 60 ml. of cold methanol saturated with ammonia and stirred in a tightly stoppered flask for 48 hours. The clear solution is evaporated under reduced pressure and the white residue redissolved in methanol and the solvent is again evaporated. After drying in vacuo there is obtained 665 mg. of the title compound (d) as white solid. TLC (SG/CHCl$_3$—MeOH, 3:1) showed a trace of impurity. $R_f$ of major component 0.44.

e. L-Pyroglutamyl-L-lysyl-glycinamide acetate

Hydrogenation of the product obtained in (d) over palladuim on carbon in the presence of acetic acid yields a colorless, foamy solid. TLC (cellulose/butanol-water-acetic acid, 4:1:1) showed two components. The material is purified by partition on Sephadex G-25 using the two phase system, pyridine-0.1 percent aq. acetic acid, n-butanol, 3:1:5. The product is characterized by amino acid analysis:

lysine — glutamic acid — glycine — ammonia = 1.00, 1.12, 0.89, 0.66.

Compounds of formula A have been found to be effective in vitro and in vivo tests in reducing platelet aggregation and adhesiveness which is the initial step in thrombus formation. The effect on platelet aggregation in vitro was measured in plateletrich plasma containing adenosine diphosphate which markedly increases aggregation in vitro. Whole blood obtained from normal fasted male rats is centrifugated at 15°-20°C. to separate the red blood cells from the platelet-rich plasma. The supernatant platelet-rich plasma is pipetted off and the remainder is centrifuged to obtain platelet-poor plasma for dilutions. In an aggregometer, a cell containing 1 ml. of platelet-rich plasma is stirred at 1,100 rpm and the compound of Example 1 is added in 0.2 ml. of buffered saline to give an initial concentration of $5.0 \times 10^{-3}$M or $3.1 \times 10^{-4}$M. After 3 minutes a concentration of adenosine diphosphate predetermined to yield maximum platelet aggregation followed by disaggregation (2 to 4$\mu$M) is added in 0.1 ml. of buffed saline. The curve of percent light transmission at 610 m$\mu$ is followed for 7 minutes. The results are expressed as the concentration which gives 50 percent inhibition of the adenosine diphosphate induced aggregation. The compound of Example 1 gave 50 percent inhibition at a concentration of $5 \times 10^{-3}$M.

The compound of Example 1 was also tested in vivo in rats at a dose of 5 mg./kg. A control cardiac blood sample is taken from each rat in the control group and the experimental group. The compound was given intraperitoneally to the experimental male rats at a dose of 5 mg./kg. After 20 minutes, 15 mg./kg. of adenosine diphosphate is injected into the leg vein. Cardiac blood samples are taken at 20, 40 and 60 seconds from the experimental and control groups. The control group is given only adenosine diphosphate. Platelet counts are made on all blood samples with a Coulter counter, the results plotted and the percentage inhibition determined. The compound of Example 1 was active in inhibiting platelet aggregation at 5 mg./kg.

The compositions are preferably administered to a mammal either by the intramuscular or intravenous route in the form of a buffered solution (e.g., saline solution) having a pH of about 7.4 containing an effective amount of the selected compound. The dosage will vary with the particular host being treated and the compound employed.

What is claimed is:

1. A tripeptide selected from those of the formula:

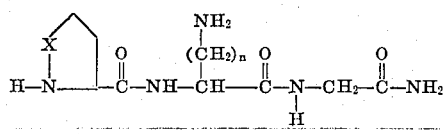

wherein:
X is selected from the class consisting of H—C—H and

$n$ is a whole number from 2 through 4; and their non-toxic salts, said amino acid residues in said tripeptide having an asymmetric α-carbon atom being of the L-form.

2. A compound according to claim 1 wherein X is H—C—H and $n$ is 4.

3. A compound according to claim 2 which is an acid addition salt of L-prolyl-L-lysyl-glycinamide.

4. A tripeptide selected from those of the formula:

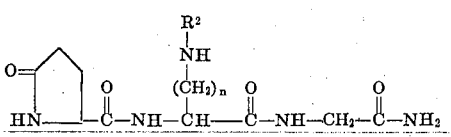

wherein:
$R^2$ is an amino protecting group and $n$ is a whole number from 2 through 4, said amino acid residues in said tripeptide having an asymmetric α-carbon atom being of the L-form.

5. A compound selected from the class consisting of L-pyroglutamyl-L-lysyl-glycinamide and its non-toxic acid addition salts.

* * * * *